United States Patent
Huang et al.

(10) Patent No.: US 10,505,637 B2
(45) Date of Patent: Dec. 10, 2019

(54) SERVICE PROCESSING METHOD AND APPARATUS AND OPTICAL LINE TERMINAL

(71) Applicant: ZTE CORPORATION, Shenzhen, Guangdong Province (CN)

(72) Inventors: Wenjie Huang, Shenzhen (CN); Chengdong Yu, Shenzhen (CN); Mingsheng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 263 days.

(21) Appl. No.: 15/308,610

(22) PCT Filed: Aug. 19, 2014

(86) PCT No.: PCT/CN2014/084751
§ 371 (c)(1),
(2) Date: Nov. 3, 2016

(87) PCT Pub. No.: WO2015/172452
PCT Pub. Date: Nov. 19, 2015

(65) Prior Publication Data
US 2017/0155449 A1    Jun. 1, 2017

(30) Foreign Application Priority Data

May 13, 2014    (CN) .......................... 2014 1 0201916

(51) Int. Cl.
*H04J 14/00*    (2006.01)
*H04B 10/27*    (2013.01)
(Continued)

(52) U.S. Cl.
CPC ............. *H04B 10/27* (2013.01); *H04L 12/28* (2013.01); *H04L 12/2856* (2013.01);
(Continued)

(58) Field of Classification Search
CPC .................. H04B 10/27; H04B 10/272; H04B 2203/5445; H04B 10/612; H04B 10/6164;
(Continued)

(56) References Cited

U.S. PATENT DOCUMENTS

| | | | |
|---|---|---|---|
| 7,693,072 B2 * | 4/2010 | Chiang | ................... H04L 41/12 370/238 |
| 7,885,549 B1 | 2/2011 | Thinguldstad et al. | |

(Continued)

FOREIGN PATENT DOCUMENTS

| | | |
|---|---|---|
| CN | 101674139 A | 3/2010 |
| CN | 102388557 A | 3/2012 |
| CN | 103220588 A | 7/2013 |

*Primary Examiner* — Hibret A Woldekidan (57) ABSTRACT

A service processing method and apparatus and an optical line terminal are provided in the present document. The method includes: establishing a corresponding relationship between a device identifier used for identifying an optical network unit ONU and a service provider SP; determining an SP providing a service according to the device identifier reported by the ONU and the corresponding relationship; and processing the service provided by the SP according to the determined SP. The present document solves the problem of resource wastes and complicated management and maintenance existing as each service provider respectively performs service operation and corresponding service management and maintenance according to respective dedicated network in the related art, thereby achieving that services of different service providers are maintained and managed in the same passive optical network, which has an effect that the network construction costs can be effectively saved, and the maintenance is convenient and efficient.

17 Claims, 5 Drawing Sheets

(51) Int. Cl.
  *H04L 12/28* (2006.01)
  *H04L 12/24* (2006.01)

(52) U.S. Cl.
  CPC ...... *H04L 12/2863* (2013.01); *H04L 12/2869* (2013.01); *H04L 12/2885* (2013.01); *H04L 41/12* (2013.01)

(58) Field of Classification Search
  CPC ............ H04B 10/6165; H04B 10/6971; H04B 10/0705; H04B 10/0793; H04L 65/4076; H04L 65/4084; H04L 12/28; H04L 12/2856; H04L 12/2863; H04L 12/2869; H04L 12/2885; H04L 41/12; H04L 12/2861; H04L 12/4641; H04L 65/1073; H04L 7/0008; H04L 9/14; H04Q 11/0067; H04Q 2011/0084; H04Q 2011/0079; H04Q 2011/0064; H04Q 2011/0073; H04J 14/0226; H04J 14/0227; H04J 14/0246; H04J 14/025; H04J 14/0282; H04J 14/0258; H04J 14/0269; H04J 3/1694
  USPC ............................. 398/58, 66, 67, 70, 71, 72
  See application file for complete search history.

(56) References Cited

U.S. PATENT DOCUMENTS

| | | | | |
|---|---|---|---|---|
| 8,457,494 | B2* | 6/2013 | Xu | H04L 12/2861 |
| | | | | 370/270 |
| 8,677,468 | B2* | 3/2014 | Nors | H04L 9/3234 |
| | | | | 398/66 |
| 9,031,408 | B2* | 5/2015 | Dahlfort | H04J 14/0246 |
| | | | | 398/58 |
| 9,143,632 | B2* | 9/2015 | Sridhar | H04N 1/00214 |
| 9,800,498 | B2* | 10/2017 | Zheng | H04L 45/68 |
| 9,825,705 | B2* | 11/2017 | Jain | H04Q 11/0067 |
| 2002/0163921 | A1* | 11/2002 | Ethridge | H04L 12/44 |
| | | | | 370/401 |
| 2009/0067840 | A1* | 3/2009 | Bernard | H04J 14/0226 |
| | | | | 398/67 |
| 2009/0269063 | A1* | 10/2009 | Bernard | H04B 10/272 |
| | | | | 398/66 |
| 2011/0289526 | A1* | 11/2011 | Poole | H04N 7/17318 |
| | | | | 725/14 |
| 2013/0257623 | A1* | 10/2013 | Bagasra | G08B 27/005 |
| | | | | 340/657 |
| 2018/0026886 | A1* | 1/2018 | Zheng | H04L 45/68 |
| | | | | 398/45 |

* cited by examiner

SERVICE PROCESSING METHOD AND APPARATUS AND OPTICAL LINE TERMINAL

TECHNICAL FIELD

The present document relates to the field of communications, and specifically, to a service processing method and apparatus and an optical line terminal.

BACKGROUND OF THE RELATED ART

Figure 1:
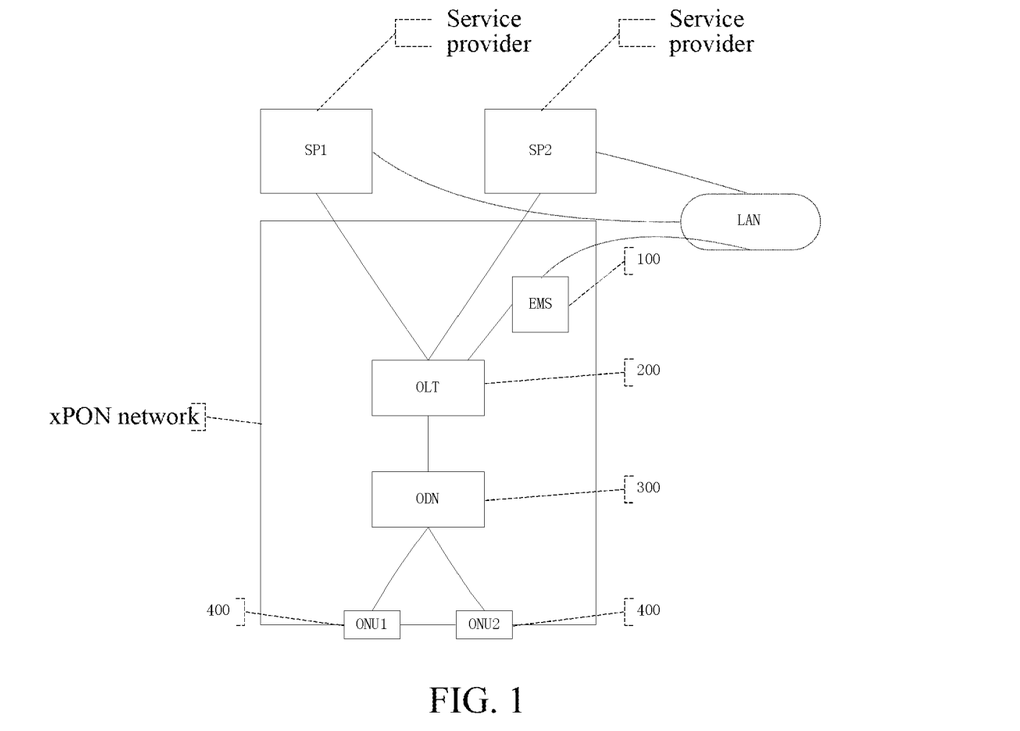
FIG. 1 is a schematic diagram of a system architecture of the passive optical network in the related art.

Passive optical network devices may be divided into an Ethernet Passive Optical Network (called EPON for short), a Gigabit-capable Passive Optical Network (called G-PON for short) and passive optical network devices based on other working mechanisms according to the working mechanisms. The system architectures of these passive optical network devices are basically consistent. FIG. 1 is a schematic diagram of the system architecture of a passive optical network in the related art. As shown in FIG. 1, the system includes an Element Management Server (called EMS), an Optical Line Terminal (called OLT for short), an Optical Distribution Network (called ODN) and a plurality of Optical Network Units (called ONUs for short). As a central office terminal device, the OLT converges multiple ONU devices through a network connection of the ODU, and the ONU devices implement accessing of the user services, thereby achieving the functions such as data services and configuration management and so on. An xPON network serves as a "point-to-multipoint" topology structure. A transmission direction from the OLT to the ONU is a downstream direction, data are sent by means of Broadcast in the downstream direction, the ONU judges whether the data are valid according to a data identification and decides to receive or discard. A transmission direction from the ONU to the OLT is an upstream direction, a Time Division Multiplexing mode is used in the upstream direction, the ONU must send an upstream Burst signal according to an upstream Bandwidth Map (called Bwmap) allocated by the OLT. In the EPON/G-PON network, a Serial Number (called SN) is a physical identifier of the ONU, and is used for the OLT to distinguish and manage each ONU.

In the above point-to-multipoint (called PToMP) access system, a Wavelength Division Multiplexing mode also may be used in the upstream direction, and each ONU sends data in a wavelength appointed for the each ONU. In the access network system, similarly a Serial Number (called SN) also serves as a physical identifier of the ONU, and is used for the OLT to distinguish and manage each ONU.

For a point-to-point communication (called PToP) access system, it also has basically identical networking system architecture, and includes an OLT and ONUs. Moreover, in the point-to-point (called PToP) communication access system, similarly there is the above system network architecture consisting of the EMS, OLT, ODN and ONUs. For example, a key distinction between a common optical Ethernet access system and a passive optical network is the point-to-point transmission mode and different transmission protocols, and the optical Ethernet access system has no essential distinction from the passive optical network with regard to the operation management mode.

In the related art, in the application of the xPON network and PToP system, the operators implement the functions of configuration, management and charging on the user services through the EMS network management. An EMS system implements an interaction of service configuration information between a PON service/PToP service itself and an activation system of the service provider by providing a service provisioning interface, in order to meet functional requirements such as voice services, broadband services, IPTV service automatic provisioning, removing, pause, recover, modification and relocation and so on in different scenarios such as Fiber to The Building (called FTTB for short) and Fiber To The Home (called FTTH for short) in the network.

At present, in the engineering installation of the xPON/PToP access system, generally different service providers all lay or arrange a dedicated optical network (called ODN), and respectively perform management and maintenance on the xPON/PToP access system and ODN network. But in the practical applications, there are the following problems required to be particularly concerned and solved:

(1) Repeated construction of the ODN network: since it is required that each service provider respectively carries out the engineering, either the construction installation costs or the latter optical network maintenance costs double increase, which causes the waste of resources.

(2) It is more troublesome for a terminal user to replace services of the service providers, especially branch optical fibers and ONUs and so on, which are accessed the home, are all required to be replaced or rewired.

(3) Multiple copies equipping and overlapping investment of the OLT office terminal devices also increase the repeated laying of trunk optical fibers and ancillary facilities.

Therefore, in the xPON/PToP networking scenario in the related art, each service provider respectively performs service operation and corresponding service management and maintenance according to respective dedicated network, which has the problem of resource wastes and complicated management and maintenance.

SUMMARY

The present document provides a service processing method and apparatus and an optical line terminal, to at least solve the problem of resource wastes and complicated management and maintenance which exists in the related art, as each service provider respectively performs service operation and corresponding service management and maintenance according to respective dedicated network.

According to one aspect of the present document, a service processing method is provided, which includes: establishing a corresponding relationship between a device identifier used for identifying an optical network unit, called ONU and a service provider, called SP; determining the SP providing a service according to the device identifier reported by the ONU and the corresponding relationship; and processing the service provided by the SP according to the determined SP.

Alternatively, processing the service provided by the SP according to the determined SP includes: sending the device identifier to the determined SP; receiving service configuration data used for establishing a service bearer, which are sent by the SP according to the device identifier; and establishing a service bearer between an optical line terminal, called OLT and the ONU according to the service configuration data.

Alternatively, sending the device identifier to the determined SP in at least one of the following ways: sending the device identifier to the determined SP via an uplink port corresponding to the device identifier; sending the device identifier to the determined SP in a way of forwarding by an element management server, called EMS corresponding to the device identifier; and sending the device identifier to the determined SP by using a passive optical network, called PON wavelength corresponding to the device identifier.

Alternatively, before determining the SP providing the service according to the device identifier reported by the ONU and the corresponding relationship, the method further includes: detecting the device identifier reported by the ONU within a preset time period, and when the device identifier reported by the ONU is detected, determining the SP providing the service according to the device identifier and the corresponding relationship.

Alternatively, after establishing the corresponding relationship between the device identifier used for identifying the ONU and the SP, the method further includes: when different SPs are switched at the ONUs, updating the established corresponding relationship between the device identifiers and the SPs.

According to another aspect of the present document, a service processing apparatus is provided, which includes: an establishment module, configured to establish a corresponding relationship between a device identifier used for identifying an optical network unit, called ONU and a service provider, called SP; a determination module, configured to determine the SP providing a service according to the device identifier reported by the ONU and the corresponding relationship; and a processing module, configured to process the service provided by the SP according to the determined SP.

Alternatively, the processing module includes: a sending unit, configured to send the device identifier to the determined SP; a receiving unit, configured to receive service configuration data used for establishing a service bearer, which are sent by the SP according to the device identifier; and an establishment unit, configured to establish a service bearer between an optical line terminal, called OLT and the ONU according to the service configuration data.

Alternatively, the sending unit is further configured to send the device identifier to the determined SP in at least one of the following ways: sending the device identifier to the determined SP via an uplink port corresponding to the device identifier; sending the device identifier to the determined SP in a way of forwarding by an element management server, called EMS corresponding to the device identifier; and sending the device identifier to the determined SP by using a passive optical network, called PON wavelength corresponding to the device identifier.

Alternatively, the apparatus further includes: a detection module, configured to detect the device identifier reported by the ONU within a preset time period, and when the device identifier reported by the ONU is detected, determine the SP providing the service according to the device identifier and the corresponding relationship.

Alternatively, the apparatus further includes: an update module, configured to, when different SPs are switched at the ONUs, update the established corresponding relationship between the device identifiers and the SPs.

According to another aspect of the present document, an optical line terminal, called OLT is provided, which includes the apparatus in any one of items mentioned above.

In the present document, a corresponding relationship between a device identifier used for identifying an optical network unit, called ONU and a service provider, called SP is established; an SP providing a service is determined according to a device identifier reported by an ONU and the corresponding relationship; and the service provided by the SP is processed according to the determined SP. Through the present document, the problem of resource wastes and complicated management and maintenance which exists in the related art is solved, the reason of the problem is that each service provider respectively performs service operation and corresponding service management and maintenance according to respective dedicated network. Thereby, the present document achieves that the services of different service providers are maintained and managed in the same passive optical network, which has an effect that not only the network construction costs can be effectively saved, but also the maintenance is convenient and efficient.

BRIEF DESCRIPTION OF DRAWINGS

Here, the described accompanying drawings are used to provide a further understanding of the present document and constitute a part of the present document. The schematic embodiments and illustrations thereof of the present document are used to explain the present document, but do not constitute an inappropriate limitation to the present document. In the drawings.

SPECIFIED EMBODIMENTS

The present document will be described in detail in combination with the accompanying drawings and embodiments below. It should be noted that the embodiments in the present document and the characteristics in the embodiments can be combined with each other in the case of no conflict.

Figure 2:
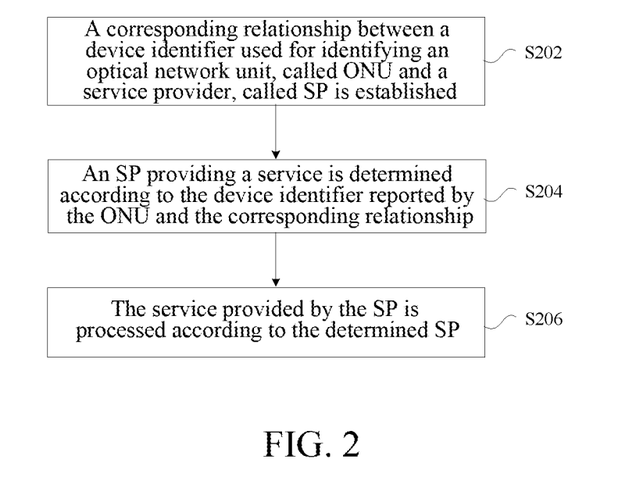
FIG. 2 is a flow chart of a service processing method according to the embodiment of the present document.

A service processing method is provided in the embodiment. FIG. 2 is a flow chart of the service processing method according to the embodiment of the present document. As shown in FIG. 2, the flow includes the following steps:

In step S202, a corresponding relationship between a device identifier used for identifying an optical network unit, called ONU and a service provider, called SP is established.

In step S204, an SP providing a service is determined according to the device identifier reported by the ONU and the corresponding relationship.

In step S206, the service provided by the SP is processed according to the determined SP.

Through the above steps, a binding relationship with the service provider, called SP is established through the device identifier of the optical network unit, that is, different service providers, called SPs are distinguished through different optical network units. Relative to the related art in which different dedicated networks are required to respectively be established for different service providers, called SPs, the above method not only solves the problem of resource wastes and complicated management and maintenance which exists in the related art as each service provider respectively performs service operation and corresponding service management and maintenance according to respective dedicated network; but also achieves that the services of different service providers are maintained and managed in the same passive optical network, which has an effect that the network construction costs can be effectively saved, and the maintenance is convenient and efficient.

Processing the service provided by the SP according to the determined SP includes it is to interact corresponding service configuration data with a corresponding SP, so that normal service data processing is performed later. For example, sending may be firstly performed on the determined SP. Certainly various sending ways may be used, for example, the sending may be completed in at least one of the following ways: the device identifier is sent to the determined SP via an uplink port corresponding to the above device identifier; the device identifier is sent to the determined SP in a way of forwarding by an element management server, called EMS corresponding to the device identifier; and the device identifier is sent to the determined SP by using a passive optical network, called PON wavelength corresponding to the device identifier. After sending the device identifier to the SP, service configuration data used for establishing a service bearer, which are sent by the SP according to the device identifier, are received; finally, a service bearer between an optical line terminal, called OLT and the ONU is established according to the service configuration data (that is, a service channel between the OLT and the ONU is established), and a corresponding service is provided according to the established service bearer.

In order to ensure that the OLT can discover the ONU in time, before determining the SP providing the service according to the device identifier reported by the ONU and the corresponding relationship, a preset time may be set for the OLT. That is, it is to appoint that a discovery flow of the device identifier is started within the preset time period. That is, the device identifier reported by the ONU is detected within a preset time period, and when the device identifier reported by the ONU is detected, the SP providing the service is determined according to the device identifier and the corresponding relationship.

In addition, after establishing the corresponding relationship between the device identifier used for identifying the ONU and the SP, when it is required to replace the service provider, that is, when different SPs are switched at the ONUs, the established corresponding relationship between the device identifiers and the SPs may be updated. That is, the previously established corresponding relationship is modified, a previous corresponding relationship between the device identifier of the ONU and the SP is removed, and the established original configuration data information due to the corresponding relationship is cleared. Meanwhile, a new corresponding relationship between the device identifier of the ONU and an SP is established, and the new corresponding relationship is updated and saved in a configuration table of the optical line terminal, that is, the previous corresponding relationship is replaced with the new corresponding relationship.

A service processing apparatus is also provided in the embodiment. The apparatus is configured to implement the above embodiments and preferred embodiments, and what have been described will not be repeated. A term "module", as used below, may be a combination of software and/or hardware for implementing preset functions. Though the apparatus described in the following embodiments is preferentially implemented by software, an implementation by hardware or a combination of software and hardware is also possible and conceived.

Figure 3:
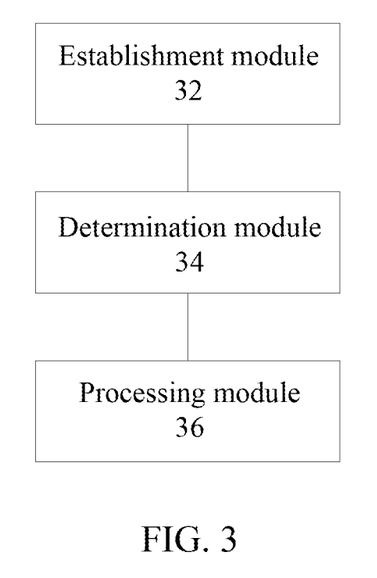
FIG. 3 is a block diagram of a structure of a service processing apparatus according to the embodiment of the present document.

FIG. 3 is a block diagram of a structure of a service processing apparatus according to the embodiment of the present document. As shown in FIG. 3, the apparatus includes an establishment module 32, a determination module 34 and a processing module 36. The apparatus will be described below.

The establishment module 32 is configured to establish a corresponding relationship between a device identifier used for identifying an optical network unit, called ONU and a service provider, called SP. The determination module 34, coupled to the above establishment module 32, is configured to determine an SP providing a service according to the device identifier reported by the ONU and the corresponding relationship. The processing module 36, coupled to the above determination module 34, is configured to process the service provided by the SP according to the determined SP.

Figure 4:
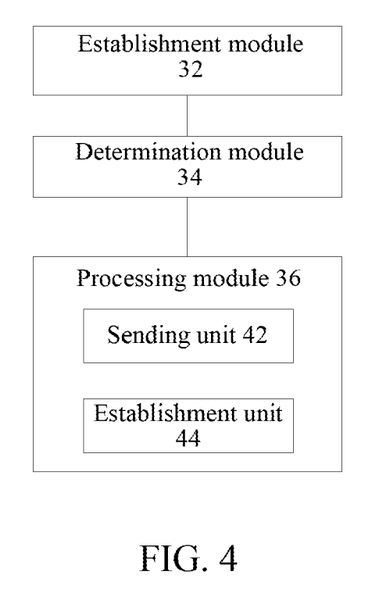
FIG. 4 is a block diagram of a preferred structure of a processing module 36 in the service processing apparatus according to the embodiment of the present document.

FIG. 4 is a block diagram of a preferred structure of a processing module 36 in the service processing apparatus according to the embodiment of the present document. As shown in FIG. 4, the processing module 36 includes a sending unit 42 and an establishment unit 44. The processing module 36 will be described below.

The sending unit 42 is configured to send a device identifier to the determined SP. A receiving unit is configured to receive service configuration data used for establishing a service bearer, which are sent by the SP according to the device identifier. And the establishment unit 44, coupled to the above sending unit 42, is configured to establish a service bearer between an optical line terminal, called OLT and the ONU according to the service configuration data.

Alternatively, the sending unit 42 is further configured to send the device identifier to the determined SP in at least one of the following ways: the device identifier is sent to the determined SP via an uplink port corresponding to the device identifier; the device identifier is sent to the determined SP in a way of forwarding by an element management server, called EMS corresponding to the device identifier; and the device identifier is sent to the determined SP by using a passive optical network, called PON wavelength corresponding to the device identifier.

Figure 5:
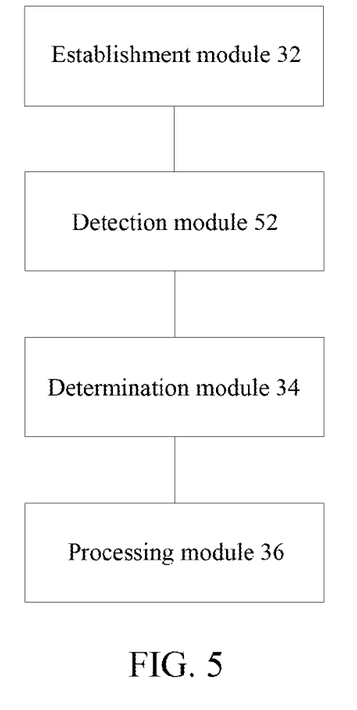
FIG. 5 is a block diagram one of a preferred structure of the service processing apparatus according to the embodiment of the present document.

FIG. 5 is a block diagram one of a preferred structure of the service processing apparatus according to the embodiment of the present document. As shown in FIG. 5, besides including all the modules shown in FIG. 3, the apparatus also includes a detection module 52. The detection module 52 will be described below.

The detection module 52, coupled to the above establishment module 32 and determination module 34, is configured to detect the device identifier reported by the ONU within a preset time period, and when the device identifier reported by the ONU is detected, determine the SP providing the service according to the device identifier and the corresponding relationship.

Figure 6:
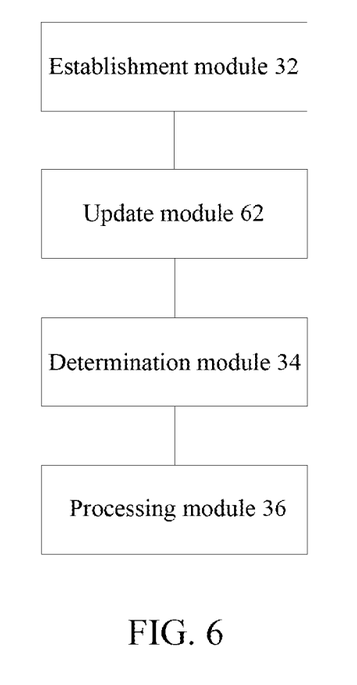
FIG. 6 is a block diagram two of a preferred structure of the service processing apparatus according to the embodiment of the present document.

FIG. 6 is a block diagram two of a preferred structure of the service processing apparatus according to the embodiment of the present document. As shown in FIG. 6, besides including all the modules shown in FIG. 3, the apparatus also includes an update module 62. The update module 62 will be described below.

The update module 62, coupled to the above establishment module 32 and determination module 34, is configured to, when different SPs are switched at the ONUs, update the established corresponding relationship between the device identifiers and the SPs.

Figure 7:
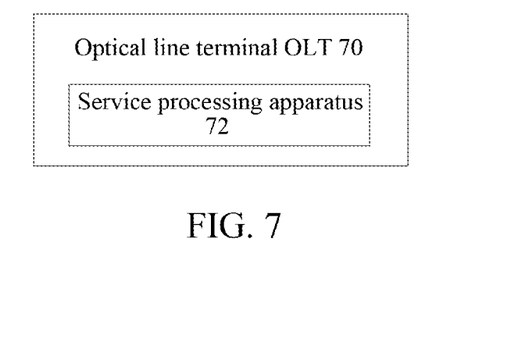
FIG. 7 is a block diagram of a structure of an optical line terminal, called OLT according to the embodiment of the present document.

FIG. 7 is a block diagram of a structure of an optical line terminal, called OLT according to the embodiment of the present document. As shown in FIG. 7, the OLT 70 includes the service processing apparatus 72 in any one of items mentioned above.

Based on the above problem, a service management method for implementing multiple service providers in the passive optical network device is provided in the embodiment. The method may be applied to a point-to-multipoint (called PToMP) and point-to-point (called PToP) communication technology/system of the Passive Optical Network (called PON for short). For an easy description in the following, the implementation way of the passive optical network xPON will be mainly described below, which is also applied to the PToP network.

It should be noted that the above device identifier used for identifying the optical network unit ONU may be various kinds, for example, the above device identifier may be an SN or an MAC address, or an SN or an MAC address is mapped to obtain an identifier, and the identifier is used to serve as an identifier for the ONU accessing different operators. Descriptions will be made with the Serial Number as an example.

By taking the SN of the ONU in the passive optical network as an identifier of the service provider (called SP), service configuration of the related service provider is sent to an ONU with a specified SN, thereby implementing the service management method for implementing multiple service providers (called SPs) in one xPON network. The service management method for multiple service providers includes the following operations:

Firstly, a configuration table is established in an OLT device. Content of the table includes an SN number of the ONU, and an uplink port or an EMS to which the ONU belongs or a PON wavelength corresponding to the ONU; herein a mapping relationship is established between the SN number and the service provider to which the SN number belongs.

Afterwards, an SN discovery process of the OLT side is started, an ONU ready to be online reports its own SN, and waits for a further configuration of the OLT.

Next, the OLT can obtain a service provider corresponding to the ONU and port (group) information corresponding to the ONU after looking up the configuration table according to an SN information. Then the SN information of the ONU is reported to an operation and maintenance system of the corresponding service provider through the port (group), or the SN information of the ONU is borne on the corresponding PON wavelength and reported to the operation and maintenance system of the service provider, or the SN information of the ONU is reported to a unified EMS and then forwarded by the EMS to the operation and maintenance system of the corresponding service provider.

Finally, the corresponding service provider sends configuration data to the OLT through an independent automatic service provisioning flow according to the reported information. The OLT then completes configuration of the OLT side based on the configuration data, and performs service configuration on the ONU at the same time; and the ONU completes the service configuration, and implements a bearer function of the service channel.

In this way, accessing multiple service providers to one OLT platform is achieved, and the operation and maintenance system of each service provider may implement the control and management on the part of the OLT service which is related to the SP, and the ONU which belongs to the SP and the part of service corresponding to the ONU which belongs to the SP directly or through the EMS.

With the above method, a binding relationship with the service provider is established through the SN, and services of different service providers may be borne in PON ports of the same xPON network and even in the same segment of physical channel in the existing network application, and switching of services of different service providers may be implemented rapidly and conveniently, which not only conforms to the operation and maintenance requirements of the xPON network operators, but also conforms to the interest requirements of the terminal users.

The preferred embodiments of the present document will be described in combination with the accompanying drawings below.

Based on the schematic diagram of the network architecture of the passive optical network in the related art, the system for implementing the service management method for multiple service providers similarly includes an EMS100, an OLT200, an ODN300 and ONUs400. Each network element will be described respectively below.

The EMS100 is configured to perform operations such as configuration, management and maintenance on the OLT200 and the xPON network.

The OLT200 is configured to start an SN discovery process of the ONU, establish a mapping relationship between the SN and the SP, provide a correct channel of the SP to perform automatic service configuration, and implement the management and configuration on the ONUs400.

The ODN300 is configured to connect various quantities of ONUs400 under the OLT200, and serve as a direct physical connection channel between the OLT200 and the ONUs400. The ODN300 may be formed by combining multiple physical devices.

The ONU400 is configured to play a role of a terminal device for a home user, be managed by the OLT200, and establish a service channel according to the configuration sent by the OLT200.

Figure 8:
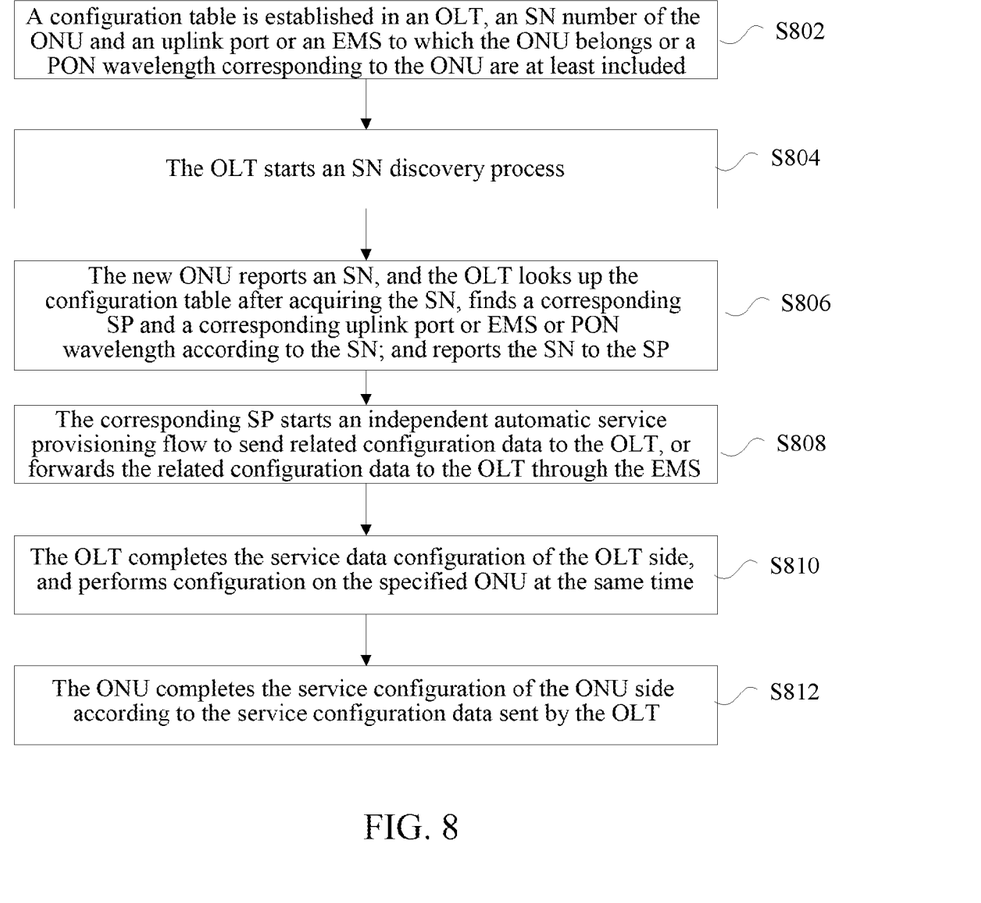
FIG. 8 is a flow chart of a service processing method for multiple service providers according to the preferred embodiment of the present document.

FIG. 8 is a flow chart of a service processing method for multiple service providers according to the preferred embodiment of the present document. As shown in FIG. 8, the method includes the following steps:

In step S802, a configuration table is established in an OLT. Content of the table at least includes an SN number of the ONU, and an uplink port or an EMS to which the ONU belongs or a PON wavelength corresponding to the ONU; herein the SN number and the SP to which the ONU belongs are in a mapping relationship.

In step S804, the OLT starts an ONU discovery process, and determines whether there is a new ONU being online with respect to each PON port.

If the new ONU being online is an ONU identifier that has been registered and authenticated, the registration is directly successful, and service configuration and provisioning is performed according to the original data. If corresponding identifier information is not contained at the PON port, the new ONU being online is regarded as a new ONU.

In step S806, the new ONU reports an SN, the OLT looks up the configuration table after acquiring the SN, finds a corresponding SP and a corresponding uplink port or EMS or PON wavelength according to the SN. Then the OLT reports the SN to the corresponding SP via the found uplink port, or reports the SN to the EMS and makes the SN forwarded by the EMS to the corresponding SP, or reports the SN to the corresponding SP by using the corresponding PON wavelength.

In step S808, the corresponding SP starts an independent automatic service provisioning flow to send related configuration data to the OLT, or forwards the related configuration data to the OLT through the EMS.

The service provisioning ways include a service flow port, a service flow forwarding way, a service VLAN and related third layer configuration, and corresponding ONU related service configuration. The OLT selecting an ONU service configuration model according to an ONU type includes that: the ONU data are configured and saved in the OLT locally, and resent after the ONU is online each time; or the data are directly configured and saved in the ONU locally and takes effect directly.

In step S810, the OLT completes the service data configuration of the OLT side according to the service configuration data sent by the SP, and performs configuration on the specified ONU at the same time.

In step S812, the ONU completes the service configuration of the ONU side according to the service configuration data sent by the OLT to complete an establishment of the entire service channel.

Figure 9:
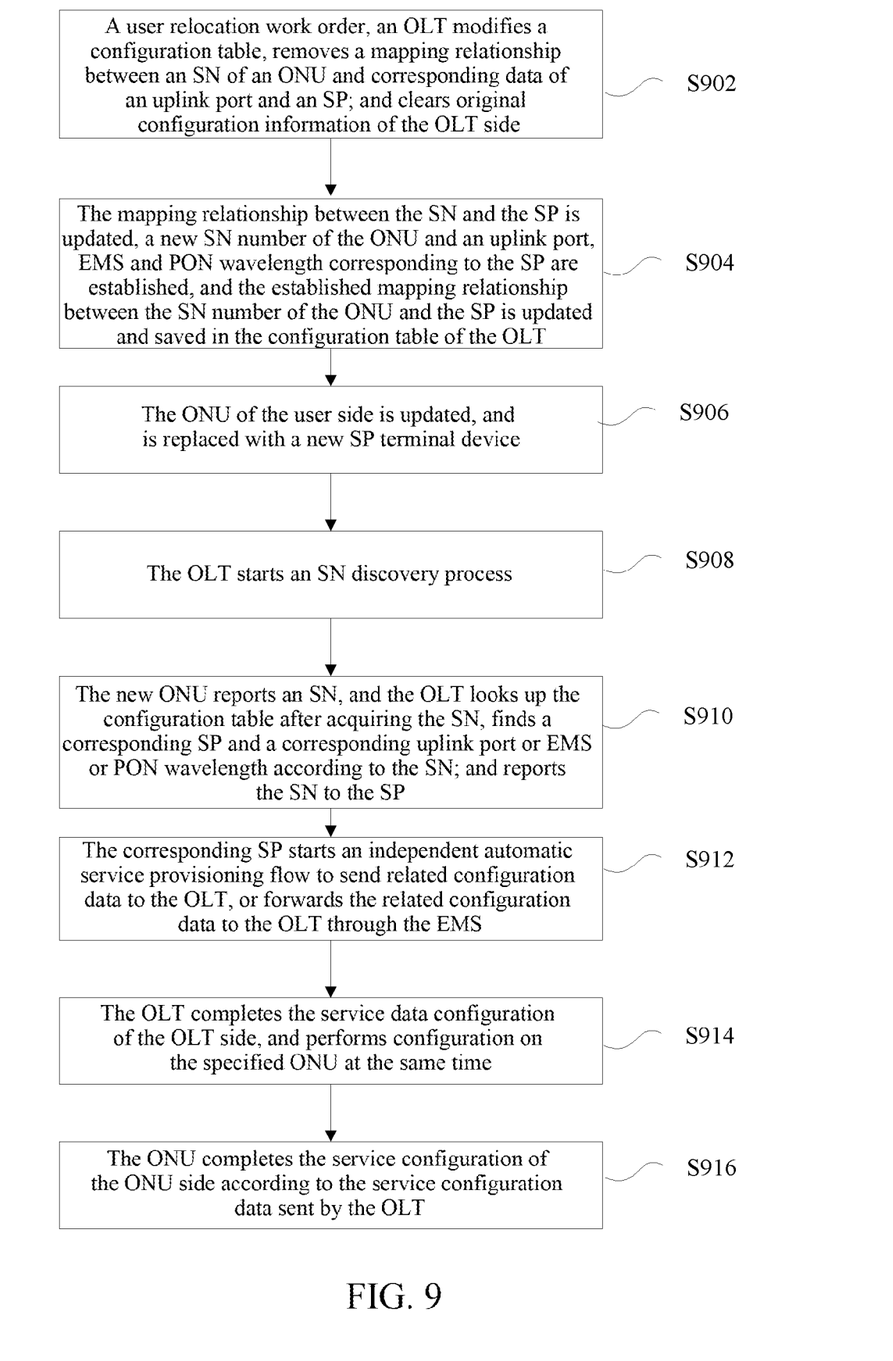
FIG. 9 is a processing flow chart of replacing a service of the service provider for multiple service providers according to the preferred embodiment of the present document.

FIG. 9 is a processing flow chart of replacing a service of the service provider for multiple service providers according to the preferred embodiment of the present document. As shown in FIG. 9, the flow includes the following steps:

In step S902, after receiving a user relocation work order, an OLT modifies a configuration table, removes a mapping relationship between an SN identifier of an ONU and corresponding data of an uplink port and an SP; and clears original configuration information of the OLT side.

In step S904, a new mapping relationship between the SN number of the ONU and the uplink port, EMS and PON wavelength corresponding to the SP (assumed that ONUs provided by different SPs are different) is established in the meantime, and the established mapping relationship between the SN number of the ONU and the SP is updated and saved in the configuration table of the OLT.

In step S906, an ONU terminal of the user side is updated, and is replaced with a new SP terminal device (an SN identifier of the new terminal is preplanned and written); and an exterior line between a user terminal and an OLT PON port keeps unchanged.

In step S908, the OLT regularly starts an SN discovery process with respect to PON ports, and determines whether there is a new ONU being online with respect to each PON port.

In step S910, the new ONU reports an SN identifier, and the OLT looks up the configuration table after acquiring the SN, finds a corresponding SP and a corresponding uplink port or EMS or PON wavelength according to the SN, and determines whether a state thereof is activated. Then the OLT reports the SN identifier of the ONU to the corresponding SP via the found uplink port, or reports the SN identifier of the ONU to the EMS and makes the SN identifier of the ONU forwarded by the EMS to the corresponding SP, or reports the SN identifier of the ONU to the corresponding SP by using the corresponding PON wavelength.

In step S912, the corresponding SP starts an independent automatic service provisioning flow to send related configuration data to the OLT, or forwards the related configuration data to the OLT through the EMS.

In step S914, the OLT completes the service data configuration of the OLT side according to the service configuration data sent by the SP, and performs configuration on the specified ONU at the same time.

In step S916, the ONU completes the service data configuration of the ONU side according to the service configuration data sent by the OLT to complete an establishment of the entire service channel.

Apparently, the people skilled in the art should understand that the various modules or steps of the present document mentioned above can be implemented through a universal calculating device, and they can be concentrated on a single calculating device or distributed in a network consisting of multiple calculating devices. Alternatively, the various modules or steps can be implemented through program codes which can be executed by the calculating device, thus, they can be stored in a storage device to be executed by the calculating device. In some cases, the illustrated or described steps can be executed in a sequence different from here, or they can be made into integrated circuit modules respectively, or multiple modules or steps of them can be made into a single integrated circuit module to be implemented. Therefore, the present document is not limited to any combination of hardware and software in a specific form.

The above description is only the preferred embodiments of the present document, which is not used to limit the present document. The present document can have various modifications and changes for the people skilled in the art. All the modifications, equivalent substitutions, and improvements, etc. made within the rule and principle of the present document shall fall into the protection scope of the present document.

What is claimed is:

1. A service processing method implemented by a service processing apparatus, comprising:
    establishing a corresponding relationship between a device identifier used for identifying an optical network unit (ONU) and each service provider (SP) of different service providers, wherein the different service providers (SPs) are distinguished through different optical network units (ONUs), services of different SPs are maintained and managed in a same passive optical network;
    determining a SP providing a service according to the device identifier reported by the ONU and the corresponding relationship; and
    processing the service provided by the SP according to the determined SP.

2. The method according to claim 1, wherein, processing the service provided by the SP according to the determined SP comprises:
    sending the device identifier to the determined SP;
    receiving service configuration data used for establishing a service bearer, which are sent by the SP according to the device identifier; and
    establishing a service bearer between an optical line terminal, called OLT and the ONU according to the service configuration data.

3. The method according to claim 2, wherein, sending the device identifier to the determined SP in at least one of the following ways:
    sending the device identifier to the determined SP via an uplink port corresponding to the device identifier;
    sending the device identifier to the determined SP in a way of forwarding by an element management server, called EMS corresponding to the device identifier; and sending the device identifier to the determined SP by using a passive optical network, called PON wavelength corresponding to the device identifier.

4. The method according to claim 1, wherein, before determining the SP providing the service according to the device identifier reported by the ONU and the corresponding relationship, the method further comprises:

detecting the device identifier reported by the ONU within a preset time period, and when the device identifier reported by the ONU is detected, determining the SP providing the service according to the device identifier and the corresponding relationship.

5. The method according to claim 1, wherein, after establishing the corresponding relationship between the device identifier used for identifying the ONU and the SP, the method further comprises:

when different SPs are switched at the ONUs, updating the established corresponding relationship between the device identifiers and the SPs.

6. A service processing apparatus, comprising a first processor and a first storage device, wherein the first storage device stores first processor-executable programs and the first processor-executable programs comprise:

an establishment module, configured to establish a corresponding relationship between a device identifier used for identifying an optical network unit (ONU) and of different service providers, wherein the different service providers (SPs) are distinguished through different optical network units (ONUs), services of different SPs are maintained and managed in a same passive optical network;

a determination module, configured to determine a SP providing a service according to the device identifier reported by the ONU and the corresponding relationship; and a processing module, configured to process the service provided by the SP according to the determined SP.

7. The apparatus according to claim 6, wherein, the processing module comprises a second processor and a second storage device, wherein the second storage device stores second processor-executable programs and the second processor-executable programs comprise:

a sending unit, configured to send the device identifier to the determined SP;

a receiving unit, configured to receive service configuration data used for establishing a service bearer, which are sent by the SP according to the device identifier; and an establishment unit, configured to establish a service bearer between an optical line terminal, called OLT and the ONU according to the service configuration data.

8. The apparatus according to claim 7, wherein, the sending unit is further configured to send the device identifier to the determined SP in at least one of the following ways:

sending the device identifier to the determined SP via an uplink port corresponding to the device identifier;

sending the device identifier to the determined SP in a way of forwarding by an element management server, called EMS corresponding to the device identifier; and sending the device identifier to the determined SP by using a passive optical network, called PON wavelength corresponding to the device identifier.

9. The apparatus according to claim 6, the first processor-executable programs further comprise:

a detection module, configured to detect the device identifier reported by the ONU within a preset time period, and when the device identifier reported by the ONU is detected, determine the SP providing the service according to the device identifier and the corresponding relationship.

10. The apparatus according to claim 6, the first processor-executable programs further comprise:

an update module, configured to, when different SPs are switched at the ONUs, update the established corresponding relationship between the device identifiers and the SPs.

11. An optical line terminal (OLT), comprising the apparatus according to claim 6.

12. The method according to claim 2, wherein, after establishing the corresponding relationship between the device identifier used for identifying the ONU and the SP, the method further comprises:

when different SPs are switched at the ONUs, updating the established corresponding relationship between the device identifiers and the SPs.

13. The method according to claim 3, wherein, after establishing the corresponding relationship between the device identifier used for identifying the ONU and the SP, the method further comprises:

when different SPs are switched at the ONUs, updating the established corresponding relationship between the device identifiers and the SPs.

14. The method according to claim 4, wherein, after establishing the corresponding relationship between the device identifier used for identifying the ONU and the SP, the method further comprises:

when different SPs are switched at the ONUs, updating the established corresponding relationship between the device identifiers and the SPs.

15. The apparatus according to claim 7, the first processor-executable programs further comprise:

an update module, configured to, when different SPs are switched at the ONUs, update the established corresponding relationship between the device identifiers and the SPs.

16. The apparatus according to claim 8, the first processor-executable programs further comprise:

an update module, configured to, when different SPs are switched at the ONUs, update the established corresponding relationship between the device identifiers and the SPs.

17. The apparatus according to claim 9, the first processor-executable programs further comprise:

an update module, configured to, when different SPs are switched at the ONUS, update the established corresponding relationship between the device identifiers and the SPs.

* * * * *